Dec. 14, 1965    D. J. KUMP ETAL    3,222,774
METHOD OF BRAZING POROUS MATERIALS
Filed March 1, 1961    3 Sheets-Sheet 1

INVENTORS
DONALD J. KUMP
NORMAN F. LAUZIERE
BY Raymond P. Wallace
AGENT

Dec. 14, 1965  D. J. KUMP ETAL  3,222,774
METHOD OF BRAZING POROUS MATERIALS
Filed March 1, 1961  3 Sheets-Sheet 3

INVENTORS
DONALD J. KUMP
NORMAN F. LAUZIERE
BY Raymond P. Wallace
AGENT

United States Patent Office 3,222,774
Patented Dec. 14, 1965

3,222,774
METHOD OF BRAZING POROUS MATERIALS
Donald J. Kump, Clearfield, and Norman F. Lauziere, Pine Glen, Karthaus, Pa., assignors to Curtiss-Wright Corporation, a corporation of Delaware
Filed Mar. 1, 1961, Ser. No. 92,710
4 Claims. (Cl. 29—488)

This invention relates to a method of brazing metals, and more particularly to a method of brazing permeable metal either to itself or to a solid member, without filling the pores of the permeable metal with brazing material by capillary action.

There are three basic types of porous or permeable metals. One is metal powder pressed and sintered to low density, so that a fluid will pass through the pores of the metal. Another is usually provided in sheet form, and comprises either a plurality of screens of woven wire assembled with the meshes more or less out of register and then rolled and sintered into a permeable sheet, or a single wire intricately wound in a criss-cross pattern on a mandrel, the resulting tube being rolled and sintered and then cut to form a sheet. The third type is wire cloth, available in a variety of weaves, wire diameters, and mesh sizes; it is sometimes rolled, but is not sintered.

It is often desired to join one of these types of permeable material either to itself or to another element by brazing, and in both cases the brazed joint may fail because the larger part of the brazing material has been drawn into the porous material by capillary action during heating. Even if the joint is successful, the permeability of the porous element may be severely impaired by the clogging of the pores over a considerable area.

The present invention overcomes these difficulties by interposing a dam between the brazing material and the porous material during the period of initial wetting and flow of the material, and then achieving a metallurgical bond between the porous metal and the other element by controlled flow and alloying of the brazing material, the dam, and the materials to be joined during the final phase of the brazing cycle.

It is therefore an object of the present invention to provide a method of making a firm brazed joint between porous metals, or between a solid metal and a porous metal.

It is another object to provide a method of brazing which restricts the spread of brazing material by capillary action in a porous metal.

A further object of this invention is the provision of a brazing method in which as alloying proceeds the liquidus of the brazing material rises, substantially reducing capillary action and resulting in the freezing of the brazing material without reduction of the temperature.

The foregoing objects and others ancillary thereto will be readily understood on reading the following specification in connection with the drawings, in which FIGURE 1 is a schematic representation of the assembly of materials before starting the brazing cycle;

Figure 1:
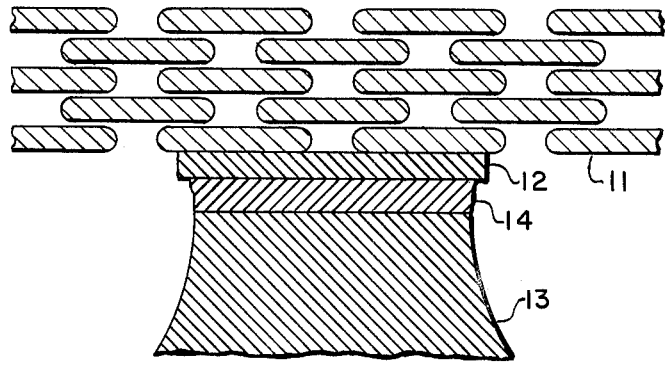

Referring more particularly to FIGURE 1, there is shown the first stage in the novel brazing method in which it is desired to braze a porous metal to a solid member.

A permeable metal 11 is shown in this instance as a portion of a sheet (much enlarged) made from pressed and sintered wire, although it will be understood that it may equally well be made of wire cloth or pressed and sintered metal powder. A dam 12 of thin sheet metal or foil is positioned on the surface of the permeable metal at the point where it is desired to braze; the dam may be held in position by brazing flux, or it may be tacked by resistance welding, or the entire assembly may be held together by clamping or other convenient means. Although for clarity of illustration the thickness of the dam is shown much exaggerated in the drawing, the metal of the dam should be as thin as can be conveniently handled, from about .001″ as the thinnest foil ordinarily procurable to about .010″ as the thickest with which the method can be easily practiced. Preference is given to sheet metal of .005″ or less.

The solid metal member 13 to be brazed to the porous sheet is coated with brazing material 14 at the point at which the joint is to be made. The area of the dam should preferably be somewhat greater than the area of the brazing material, in order to insure that the brazing material will not come into contact with the porous sheet. In fact, if the configuration of the parts permits, the dam may be curved over the solid member in an encasing relationship, and the brazing material placed between the curved wing portions of the dam and the solid member, to flow to the joint area by capillary action during heating.

Figure 2:
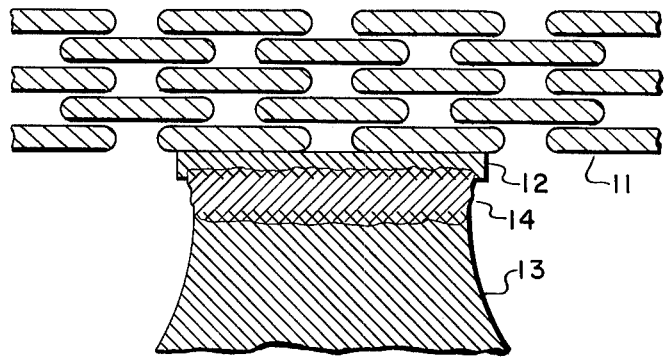
FIGURE 2 is a schematic of the beginning of the brazing cycle.

The entire assembly is then heated by any suitable means, preferably in a furnace, to a temperature above the solidus of the brazing material but below its liquidus, and held at that temperature for a time suited to the materials being used. This portion of the operation is called the first period of the brazing cycle. During this first period the brazing material, although not completely melted, wets the apposed surfaces of the solid part and the dam, but is confined thereto. Also during this first period there occurs a solid phase diffusion and subsequent alloying between the brazing alloy and the adjacent surfaces, as shown in FIGURE 2. The length of the first period is determined by the time required to cause the liquidus of the metal dam to be lowered, as a result of solid phase diffusion and alloying with the brazing material, to meet the liquidus of the brazing material, which is rising owing to such solid phase diffusion and alloying. The comparative thickness of the dam to the thickness of the brazing alloy should be such as to cause a relatively large reduction of the liquidus of the dam with a relatively small rise in the liquidus of the brazing alloy. This relationship is shown in FIGURE 5.

Figure 3:
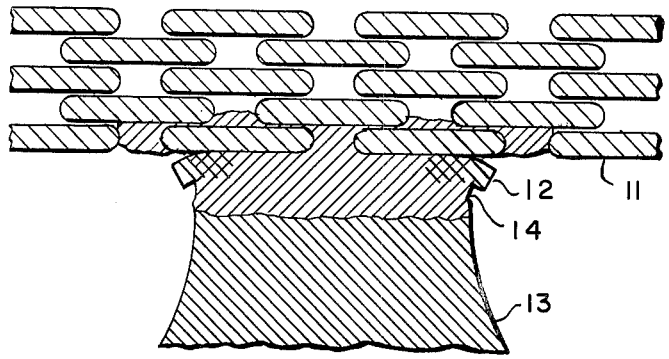
FIGURE 3 is a schematic of a later portion of the brazing cycle.
Figure 4:
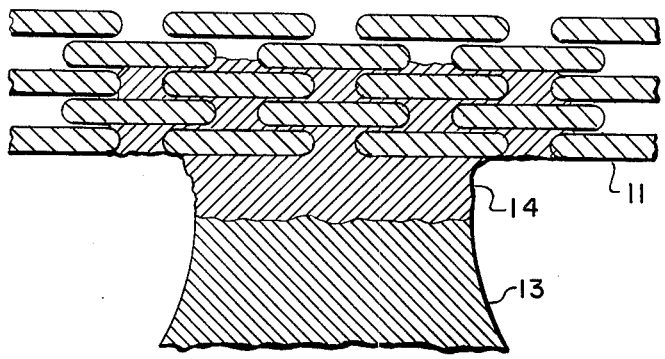
FIGURE 4 is a schematic of the completed brazed joint.

When the falling liquidus of the dam and the rising liquidus of the brazing alloy meet, the two elements of the dam and brazing alloy are no longer to be individually distinguished, but merge as components of the material of the reaction, which retains the numeral 14 in the drawings for convenience. There ensues then the second period of the brazing cycle, the beginning of which is shown in FIGURE 3. In the second period the temperature is raised to a point slightly above the liquidus of the material of the reaction and held there for a suitable length of time. During the second period the reaction material flows into the pores of the permeable metal. However, the flow is limited to a small area and a small depth of the permeable metal because of the now rapidly rising liquidus of the reaction material, owing to continuing alloying and diffusion. Freezing of the alloy comprising the reaction material occurs rapidly under these conditions without reduction of the temperature, and a metallurgical bond is achieved with the surface of the solid member as well as with the porous member. FIGURE 4 shows the completed joint at the end of the second period, with the dam wholly absorbed, after which the assembly is cooled and is ready for use. There is thus produced a brazed joint between a solid member and a porous metal, in which the flow of brazing material (or reaction material) into the pores of the permeable metal is restricted to a small zone in the immediate vicinity of the joint, whereby the permeability of the porous metal is not substantially diminished. It may be desired to braze two porous metals together, whereupon the same procedure is followed, except that two dams are used, each in contact with some of the porous elements, and having the brazing material disposed between the two dams.

Figure 5:
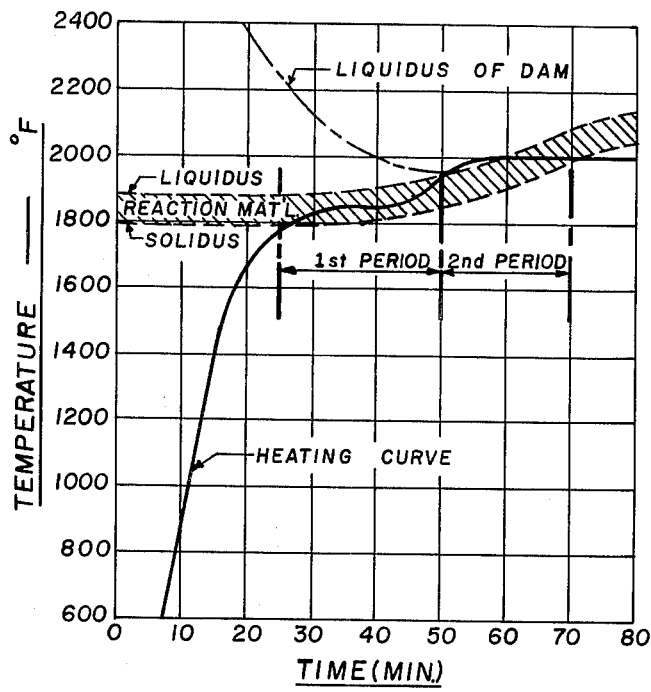
FIGURE 5 is a graphical analysis of the brazing cycle.

FIGURE 5 shows a graphical analysis of the brazing cycle. The times and temperatures given and the curves shown are for the method as used with a dam of nickel and a solid member either of nickel or nickel-plated, and brazing material known by the designation Nicrobraz 120 (a registered trademark of the Wall Colmonoy Corporation) having the following approximate composition:

| | Percent |
|---|---|
| Carbon | .78 |
| Chromium | 14.35 |
| Boron | 3.19 |
| Silicon | 4.02 |
| Iron | 4.63 |
| Nickel | 72.90 |

However, the method can be practised with various metals and brazing materials, and the relation of the heating curve, liquidus, and solidus will have the typical form shown.

The separation between the solidus and the liquidus of the reaction material is shown in the hatched area of FIGURE 5. At the beginning of the operation, shown at the left of FIGURE 5, the reaction material is, of course, wholly Nicrobraz 120, having a solidus of 1785° F. and a liquidus of 1895° F. As heating proceeds, solid phase diffusion and alloying commence, and the liquidus of the dam begins to drop sharply; as a result of such alloying and diffusion, the liquidus and solidus of the reaction material rise, although not so steeply, and remaining in a more or less parallel relation. When the temperature reaches the solidus of the reaction material, in the neighborhood of 1800° F. with the combination of materials depicted in the drawing, the so-called first period of actual brazing begins, as the reaction material begins to wet the adjacent surfaces. As wetting continues, diffusion and alloying also continue so that the liquidus of the dam continues to drop.

Finally the dam liquidus drops to the point where it meets that of the reaction material, and the second period begins. The temperature is now raised somewhat higher than that of the combined liquidus, and the reaction material flows by capillary action. This period is relatively short, since the liquidus curve of the reaction material keeps on rising, so that even though the temperature remains constant the liquidus is soon above it again. At this point the reaction material may be said to begin to freeze, and as the solidus also continues to rise more or less parallel to the liquidus, the temperature line soon crosses the solidus and the joint is complete. It now need only be cooled to the ready for use.

It is to be understood that although the times and temperatures in FIGURE 5 described a typical reaction, they are not necessarily precise, since the composition of metals and brazing materials used may vary somewhat from one batch to another, as may heating conditions. Also, although a graphical analysis is given only for nickel and Nicrobraz 120, the method may be practised with steel, stainless steel, nickel base alloys, cobalt base alloys, tungsten, platinum, molybdenum, columbium, and chromium, and any brazing materials compatible therewith, which are well known in the art.

Figure 6:
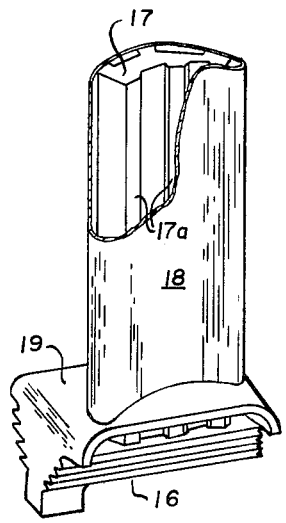
FIGURE 6 is a perspective view, partially broken away, of an airfoil assembled by the novel brazing process.

FIGURE 6 shows a perspective view, partly broken away, of an airfoil, as for a gas turbine, assembled by the novel method and suitable for transpiration cooling. A base 16 of the conventional fir-tree pattern has extending therefrom a ribbed metal strut 17. A sheath 18 of porous metal surrounds the strut in airfoil configuration and is brazed to the ribs 17a thereof by the method hereinbefore described. Air or other cooling fluid is admitted to the interior of the airfoil blade under shelf 19 and travels between the ribs, bleeding through the permeable sheath to keep it cool during operation.

Although the method of this invention has been described above in preferred practice, it will be understood that various changes and modifications may be made by those skilled in the art without departing from the scope of the invention. It is intended to cover all such modifications by the appended claims.

What is claimed is:

1. A method of brazing porous materials, comprising the steps of placing one side of a metal dam of about .001" to .010" thickness and including nickel in its composition in contact with a porous metal, apposing a metal element having a surface including nickel to the other side of said dam, said porous metal and said metal element being selected from the group consisting of steel, stainless steel, nickel base alloy, cobalt base alloy, tungsten, platinum, molybdenum, columbium, and chromium, disposing brazing material including in its composition an element selected from the group consisting of boron, silicon, and carbon between and in contact with said dam and said metal element to form a brazing assembly, said brazing material having an initial solidus and an initial liquidus approximately 100° F. apart, said initial brazing material liquidus being lower than the initial liquidus of said dam, heating said assembly to a temperature above said brazing solidus and below said brazing liquidus for a first period to progressively alloy said dam and said metal element with said brazing material by solid phase diffusion during said first period to lower the liquidus of said dam to approximately the liquidus of said brazing material to form a reaction material combining said dam and said brazing material, further heating said assembly during a second period to a temperature above the liquidus of said reaction material to unite said reaction material and said porous element, and thus raising the solidus of said reaction material during said second period above the temperature of said assembly by further progressive alloying of said reaction material to freeze said reaction material while maintaining said second temperature to join said porous metal and said metal element by metallurgical bonding with a minimum of infiltration of reaction material into the pores of said porous metal.

2. A method of brazing porous materials, comprising the steps of placing one side of a first metal dam of about .001" to .010" thickness and including nickel in its composition in contact with a first porous metal; placing one side of a second metal dam of about .001" to .010" thickness and including nickel in its composition in contact with a second porous metal; said first and second porous metals being selected from the group consisting of steel, stainless steel, nickel base alloy, cobalt base alloy, tungsten, platinum, molybdenum, columbium and chromium, disposing brazing material including in its composition an element selected from the group consisting of boron, silicon, and carbon between said dams and in contact therewith to form a brazing assembly; said brazing material having an initial solidus and an initial liquidus approximately 100° F. apart, said initial brazing material liquidus being lower than the initial liquidus of said dams; heating said assembly to a temperature above said brazing solidus and below said brazing liquidus for a first period to progressively alloy said dams with said brazing material by solid phase diffusion during said first period to lower the liquidus of said dams to approximately the liquidus of said brazing material to form a reaction material combining said dams and said brazing material; further heating said assembly during a second period to a temperature above the liquidus of said reaction material to unite said reaction material and said first and second porous metals, and thus raising the solidus of said reaction material during said second period above the temperature of said assembly by further progressive alloying of said reaction material to freeze said reaction material while maintaining said second temperature to join said porous metals by metallurgical bonding with a minimum of filtration of reaction material into the pores of said porous metals.

3. A method of brazing porous materials, comprising the steps of placing one side of a metal dam of about .001″ to .010″ thickness and including nickel in its composition in contact with a porous metal; apposing a metal element having a surface including nickel to the other side of said dam, said porous metal and said metal element being selected from the group consisting of steel, stainless steel, nickel base alloy, cobalt base alloy, tungsten, platinum, molybdenum, columbium, and chromium; disposing brazing alloy between and in contact with said dam and said metal element to form a brazing assembly; said dam and said brazing alloy being brazingly compatible with each other and with said porous metal and said metal element; said brazing alloy having an initial liquidus appreciably higher than its initial solidus and lower than the initial liquidus of said dam and containing in its composition an interstitial element capable of solid phase diffusion into said dam; heating said assembly to a temperature above said brazing solidus and below said brazing liquidus for a first period to progressively alloy said dam and said metal element with said brazing alloy by solid phase diffusion during said first period to lower the liquidus of said dam to approximately the liquidus of said brazing alloy to form a reaction material combining said dam and said brazing material; further heating said assembly during a second period to a temperature above the liquidus of said reaction material to unite said reaction material and said porous metal, and thus raising the solidus of said reaction material during said second period above the temperature of said assembly by further progressive alloying of said reaction material to freeze said reaction material while maintaining said second temperature to join said porous metal and said metal element by metallurgical bonding with a minimum of infiltration of reaction material into the pores of said porous metal.

4. A method of brazing porous materials, comprising the steps of placing one side of a first metal dam of about .001″ to .010″ thickness and including nickel in its composition in contact with a first porous metal; placing one side of a second metal dam of about .001″ to .010″ thickness and including nickel in its composition in contact with a second porous metal; said first and second porous metals being selected from the group consisting of steel, stainless steel, nickel base alloy, cobalt base alloy, tungsten, platinum, molybdenum, columbium, and chromium; disposing brazing alloy between and in contact with said dams to form a brazing assembly; said dams and said brazing alloy being brazingly compatible with each other and with said porous metals; said brazing alloy having an initial liquidus appreciably higher than its initial solidus and lower than the initial liquidus of said dams and containing in its composition an interstitial element capable of solid phase diffusion into said dams; heating said assembly to a temperature above said brazing solidus and below said brazing liquidus for a first period to progressively alloy said dams with said brazing material by solid phase diffusion during said first period to lower the liquidus of said dams to approximately the liquidus of said brazing alloy to form a reaction material combining said dams and said brazing alloy; further heating said assembly during a second period to a temperature above the liquidus of said reaction material to unite said reaction material and said first and second porous materials, and thus raising the solidus of said reaction material during said second period above the temperature of said assembly by further progressive alloying of said reaction material to freeze said reaction material while maintaining said second temperature to join said porous metals by metallurgical bonding with a minimum of infiltration of reaction material into the pores of said porous metals.

References Cited by the Examiner

UNITED STATES PATENTS

| | | | |
|---|---|---|---|
| 2,323,160 | 6/1943 | Stecher et al. | 29—490 X |
| 2,450,339 | 9/1948 | Hensel | 29—163 |
| 2,739,375 | 3/1956 | Coxe | 113—110 X |
| 2,807,437 | 9/1957 | Roush | 29—420.5 X |
| 2,893,664 | 7/1959 | Gerhauser | 29—490 X |
| 2,961,759 | 11/1960 | Weissflock | 29—498 X |
| 3,061,912 | 11/1962 | Kalil | 29—163.5 |

JOHN F. CAMPBELL, *Primary Examiner.*

IRVING FEINBERG, *Examiner.*